Figure 1:
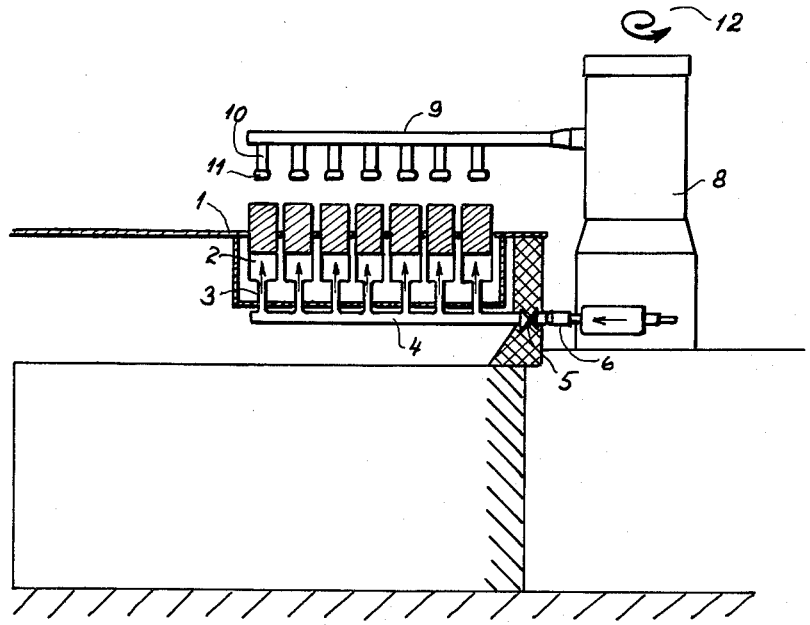

March 8, 1966            H. GRAM            3,239,053
METHOD OF REMOVING FROZEN BODIES FROM FREEZING POCKETS OF A
FREEZING TABLE AND APPARATUS FOR CARRYING OUT THE METHOD
Filed April 6, 1964            2 Sheets-Sheet 1

INVENTOR.
Hans Gram
BY
Watson, Cole, Grindle & Watson
ATTORNEYS

March 8, 1966  H. GRAM  3,239,053
METHOD OF REMOVING FROZEN BODIES FROM FREEZING POCKETS OF A
FREEZING TABLE AND APPARATUS FOR CARRYING OUT THE METHOD
Filed April 6, 1964  2 Sheets-Sheet 2

3,239,053
METHOD OF REMOVING FROZEN BODIES FROM FREEZING POCKETS OF A FREEZING TABLE AND APPARATUS FOR CARRYING OUT THE METHOD
Hans Gram, Vojens, Denmark, assignor to Brodrene Gram A/S, Vojens, Denmark
Filed Apr. 6, 1964, Ser. No. 357,624
Claims priority, application Denmark, Apr. 6, 1963, 1,625/63
2 Claims. (Cl. 198—20)

This invention relates to a method of removing frozen bodies from freezing pockets of a freezing table and transferring said frozen bodies to gripping members in a position above said freezing table, and also to an apparatus for carrying out the method.

In the known apparatuses having a table with freezing pockets, and gripping members capable of being positioned above the latter, the frozen bodies have been removed from the freezing pockets by lowering the gripping members and causing them to mechanically grip a suspending element embedded in each frozen body and extending upwardly therefrom, whereafter the gripping members are again moved upwards so as to withdraw the frozen bodies from the freezing pockets.

The described lifting and lowering of the gripping members of a freezing apparatus of the type referred to is relatively complicated, and it is the object of the invention to avoid this complication so that the frozen bodies may be removed from the freezing pockets and transferred to the gripping members without any necessity of moving the latter in the vertical direction.

With this object in view, according to the invention, the frozen bodies are subjected to a difference of gas pressure as between their bottoms and their tops, the gas pressure being higher at the bottoms than at the tops. It has been found possible to move the frozen bodies out of the freezing pockets and into engagement with the gripping members solely under the influence of such a pressure difference whereby the whole transfer movement here considered is effected in a very simple and hygienic manner.

It will be understood that the upward movement of the frozen bodies may be effected by exerting a pressure higher than that of the surrounding atmosphere on the bottoms of the frozen bodies so that the latter are expelled from the freezing pockets to be gripped by the gripping members. The latter may be constructed with spring catching means. However, such a mechanical gripping and holding of the frozen bodies may give rise to injury to the frozen bodies. Therefore, according to a preferred embodiment of the invention, a gaseous medium is supplied to the bottoms of the freezing pockets at a pressure higher than that of the surrounding atmosphere, while at the same time subjecting suction gripping means of said gripping members to vacuum, said pressure and said vacuum being so selected as to be capable of moving said bodies to a position where their bottoms are situated above the upper face of said freezing table, and to cause said gripping members to grip and hold said frozen bodies by suction effect when so moved. In this manner the gripping members will act as suction heads, and their suction will support the upward movement of the frozen bodies. The suction heads may be used for directly conveying the frozen bodies away from the freezing table.

Where the novel apparatus is used in conjunction with a freezing machine having a freezing table with rows of freezing pockets, and gripping members capable of being positioned above a row of freezing pockets, the pockets of each row may, according to the invention, preferably be connected with each other at their bottoms by means of a passage system, means being provided for successively connecting said passage systems to a source of a gaseous medium at a pressure higher than that of the surrounding atmosphere.

An additional advantage of the said passage systems is that these may be used for introducing and/or withdrawing cleaning media and drying media, and the apparatus may therefore, according to the invention, advantageously be provided with sources of such media which sources are connectable to said passage systems.

The invention will now be described in further detail with reference to the accompanying drawings in which—

Figure 2:
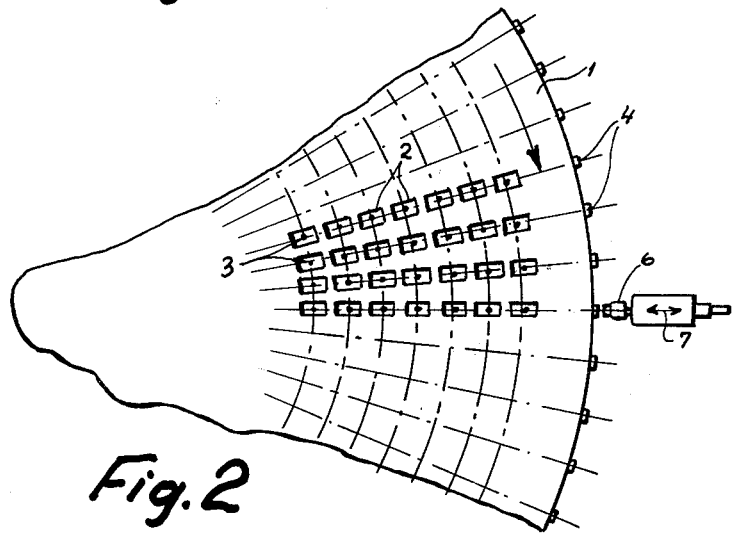
Figure 3:
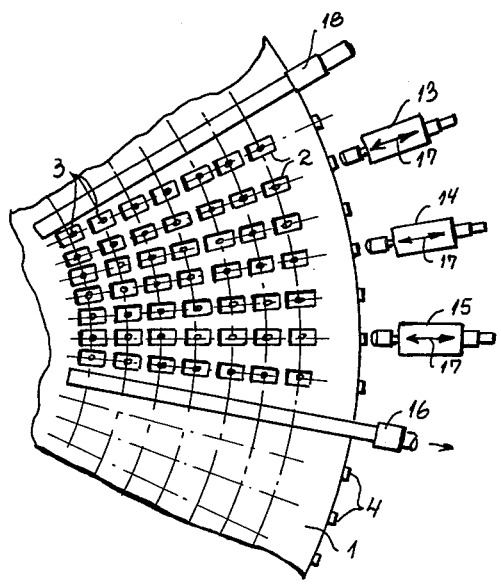

FIG. 1 diagrammatically shows the characteristic parts of one form of an apparatus according to the invention in side view and partly in section, FIG. 2 a fractional top view of the apparatus of FIG. 1 with certain parts removed, and FIG. 3 a view similar to FIG. 2 but illustrating a modified embodiment of the invention.

In the drawing, 1 is the table top of a freezing table constructed with a multitude of freezing pockets 2 arranged in radial rows. These freezing pockets serve to receive materials such as meat, fish, vegetables or ice cream to be frozen. In the embodiment illustrated, the freezing takes place by causing a freezing medium to flow around the freezing pockets.

The bottom of each pocket is connected through a pipe 3 with a radially extending distribution pipe 4, one such pipe being provided for each radial row of freezing pockets, the distribution pipe 4 and the branch pipes 3 forming a passage system belonging to each radial row of freezing pockets. Each pipe 4 opens at the circumference of the freezing table 1, a non-return valve being provided immediately behind the opening end of each pipe 4.

A nozzle 6 for compressed air is arranged radially outside the pipes 4. This nozzle 6 is adapted to be moved radially forth and back by control means not shown, such as indicated by a double arrow 7 in FIG. 2.

Laterally of the table 1 a tower 8 is arranged which carries a radially extending pipe 9 in which suction heads 11 are carried by means of branch pipes 10. The tower 8 is rotatable about its vertical axis, such as indicated by an arrow 12, and the suction heads 11 are connected with a source of vacuum, not shown, via the branch pipes 10 and the pipe 9.

The operation of the apparatus shown is as follows:

After the material in the freezing pockets 2 has been frozen, a temporary thawing is effected in order to loosen the frozen bodies from the walls of the freezing pockets. The frozen bodies are now ready for removal from the pockets. To this end, the table 1 is topped when a row of frozen bodies ready for removal is in a position radially opposite the air nozzle 6, whereafter the nozzle 6 is engaged with the end of the pipe 4 belonging to the row in question, and compressed air is supplied through the pipe 4 and the branch pipes 3 to the bottoms of the freezing pockets, whereby the frozen bodies are moved upwards like pistons slidable in cylinders formed by the freezing pockets. In FIG. 1 the frozen bodies are shown in the middle of their stroke out of the freezing pockets. They are illustrated as being located in exactly the same level, but it will be understood that this need not be the case in actual practice because pressure variations may occur along the pipe 4, and the friction between the freezing pockets and the frozen bodies therein may vary from pocket to pocket. While the frozen bodies are being ejected, vacuum is at the same time supplied to the suction heads 11 so that the frozen bodies, when reaching the suction heads 11, will be held by these and may now, by rotation of the suction pipe 9 parallel to the plane of the table, be moved outside the table and deposited e.g. on a feeding chute of a packing machine.

The distance between the bottom face of the suction heads 11 and the top face of the table 1 is greater than the height of the frozen bodies so that it is not necessary to move the suction pipe 9 in the vertical direction. Since the suction heads 11 are subjected to vacuum while the frozen bodies are being ejected, the suction heads will be effective in supporting the upward movement of the frozen bodies. However, the suction heads may, if desired, be replaced by mechanical gripping means which may e.g. be operated to clasp the upper ends of the frozen bodies when these strike the gripping means during the upward movement caused by the compressed air supplied to the bottoms of the freezing pockets.

In the embodiment of FIG. 3, the passage systems 3, 4 provided according to the invention are additionally utilized for cleaning the freezing pockets after removal of the frozen bodies. To this end, the machine, in addition to a compressed air nozzle 6, has a nozzle 13 for the supply of washing water, a nozzle 14 for the supply of steam, a nozzle 15 for the supply of steam with a cleaning agent e.g. chlorine vapor, and a suction device consisting of a horizontal pipe 16 with depending branch tubes adapted to be introduced into the pockets from above in order to remove the cleaning media introduced into the pockets.

The nozzles 13–15 are constructed similarly to the compressed air nozzle 6 so that these nozzles may be moved radially back and forth, as indicated by double arrows 17, for the purpose of connecting the nozzles to the passage systems and disconnecting them therefrom during the periods of rest of the table. Besides, the apparatus of FIG. 3 is provided with a mechanism consisting of a horizontal arm 18 with downwardly projecting cleaning members adapted to be introduced into the freezing pockets from above.

I claim:
1. An apparatus including a freezing machine having a freezing table with rows of freezing pockets therein, and gripping members mounted above said table for relative movement to positions above the respective rows of freezing pockets, means for removing the frozen bodies from said pockets and transferring them to said gripping members including a passage system connecting the pockets of each row with each other at their bottoms, means being provided for successively connecting said passage systems to a source of a gaseous medium at a pressure higher than that of the surrounding atmosphere, said source of a gaseous medium being provided with a nozzle and means supporting said nozzle for radial displacement relative to the freezing table, said table being rotatable about a vertical axis.

2. An apparatus as defined in claim 1, comprising, in addition to said source of a gaseous medium, sources of cleaning media and means for connecting said sources of cleaning media to said passage systems, each of said last-mentioned sources including a nozzle which is radially displaceable relative to the freezing table.

References Cited by the Examiner

UNITED STATES PATENTS

| 1,984,031 | 12/1934 | Purdy | 198—20 X |
| 2,146,572 | 2/1939 | Hahn | 198—20 X |

FOREIGN PATENTS 465,474  8/1928  Germany.

EVON C. BLUNK, *Primary Examiner.*

EDWARD A. SROKA, *Examiner.*